United States Patent [19]

Stallard, III

[11] Patent Number: 5,333,913

[45] Date of Patent: Aug. 2, 1994

[54] GALVANIC ISOLATION DEVICE

[75] Inventor: Clinton W. Stallard, III, Hampton, Va.

[73] Assignee: Newport News Shipbuilding and Dry Dock Company, Newport News, Va.

[21] Appl. No.: 17,690

[22] Filed: Feb. 12, 1993

[51] Int. Cl.[5] .............................. F16L 55/00
[52] U.S. Cl. ........................ 285/48; 285/50; 285/55; 285/286; 285/406
[58] Field of Search ............... 285/48, 49, 50, 55, 285/405, 363, 416, 286

[56] References Cited

U.S. PATENT DOCUMENTS

| | | |
|---|---|---|
| 1,514,903 | 11/1924 | Gush . |
| 1,592,175 | 7/1926 | Boyd . |
| 2,001,573 | 5/1935 | Haushalter ................ 285/49 |
| 2,464,487 | 3/1949 | Chappell et al. ........... 285/55 |
| 2,752,579 | 6/1956 | Caldwell et al. ........ 285/48 X |
| 3,335,758 | 8/1967 | Bertolet, Jr. ........... 285/55 X |
| 3,347,568 | 10/1967 | Weeden, Jr. et al. ........ 285/55 |
| 3,420,553 | 1/1969 | Poxon et al. .......... 285/303 X |
| 4,345,785 | 8/1982 | Bradford . |
| 4,406,467 | 9/1983 | Burger et al. . |
| 4,776,600 | 10/1988 | Kohn . |
| 4,848,804 | 7/1989 | Weigl . |
| 5,149,142 | 9/1992 | Walko et al. ........... 285/55 X |
| 5,163,715 | 11/1992 | Richard et al. ............ 285/55 |

FOREIGN PATENT DOCUMENTS

| | | | |
|---|---|---|---|
| 857186 | 12/1970 | Canada ..................... 285/55 |
| 591611 | 8/1947 | United Kingdom ............ 285/55 |
| 1180047 | 2/1970 | United Kingdom ............ 285/55 |

*Primary Examiner*—Randolph A. Reese
*Assistant Examiner*—Heather Chun
*Attorney, Agent, or Firm*—Lalos & Keegan

[57] ABSTRACT

Galvanic isolation between two fluid-conducting members made of dissimilar materials is provided by a coupling pipe that separates the two members (e.g. a pipe and a valve). The coupling pipe includes a tubular section and two flange sections, which mate with the two fluid-conducting members. An insulating liner on the inside diameter of the tubular and flange sections of the coupling device extends the entire length of coupling pipe and is coextensive with flange insulators that separate the coupling pipe from the two fluid-conducting members. The substantial separation distance provided by the coupling pipe with continuous insulation prevents or significantly reduces electrochemical corrosion.

20 Claims, 2 Drawing Sheets

GALVANIC ISOLATION DEVICE

FIELD OF THE INVENTION

The present invention relates to devices for coupling two pipes or fluid-carrying members and more specifically to devices for isolating two pipes or fluid-carrying members to inhibit galvanic electric currents from flowing therebetween.

BACKGROUND OF THE INVENTION

In general, when two metals are connected to each other and are immersed in sea water, or other salt solutions that are not too acid or alkaline, there will be a corrosive action only if the metals are dissimilar. If the metals are dissimilar, electrochemical corrosion will occur and one metal will be anodic to (i.e. corroded by) the other metal, which will be rendered cathodic. This problem of electrochemical corrosion is prevalent in seawater piping systems in which leaking may occur at pipe joints.

In an effort to overcome the problem of corrosion, a number of different anticorrosion systems or electrical insulation systems have been proposed. For example, Gush (U.S. Pat. No. 1,514,903) describes an anticorrosion device suitable for water-cooling apparatus of internal combustion engines. A thin insulating sleeve is used to separate an electrode from the wall of the structure. Boyd (U.S. Pat. No. 1,592,172) and Bradford (U.S. Pat. No. 4,345,785) utilize an electrical insulating gasket between sections of metal pipes. Burger et al (U.S. Pat. No. 4,406,467) and Kohn (U.S. Pat. No. 4,776,600) utilize reinforced dielectric pipe flange gaskets. Weigl (U.S. Pat. No. 4,848,804) describes a dielectric tube coupling in which insulation is provided by sleeves surrounding the outside of the tube.

A drawback to each of these prior art apparatus is the close proximity of dissimilar metals. Even though direct contact is prevented by the insulation material, the separation boundary is too small to adequately prevent galvanic action.

SUMMARY OF THE INVENTION

The present invention overcomes the disadvantages of the prior art by providing a significant separation distance between dissimilar materials. A coupling pipe of predetermined length is connected between two fluid-carrying members of dissimilar materials, e.g. a copper-nickel pipe and a steel valve. The coupling pipe is provided with flat-faced flanges on each end for attachment to the two fluid-carrying members. Dielectric insulators are provided on each flat-faced flange to insulate the coupling pipe from fluid-carrying members. A fluid passage insulator is provided on the inside diameter of the coupling pipe along the entire length of the coupling pipe. The fluid passage insulator is coextensive with the two flange insulators to provide continuous insulation along the length of the coupling pipe.

In contrast to prior art gaskets, the coupling pipe of the present invention with continuous insulation along its entire length provides substantial galvanic isolation between the fluid-carrying members of dissimilar materials. This greatly reduces the tendency of the less noble material to be corroded by the more noble material. The length of the pipe is preselected by the designer based on the diameter of the fluid passageway, the magnitude of dissimilarity between the two materials and the expected life cycle of the parts. As is well known, metals and alloys are arranged in a series (electromotive series) in the order of their solution pressures. Such series effectively lists the metals/alloys in order of decreasing corrodibility. In the present invention, with two materials (metals/alloys) being coupled, the further apart the materials are in the electromotive series the greater the separation distance required to substantially reduce or prevent galvanic corrosion.

DETAILED DESCRIPTION

Figure 1:
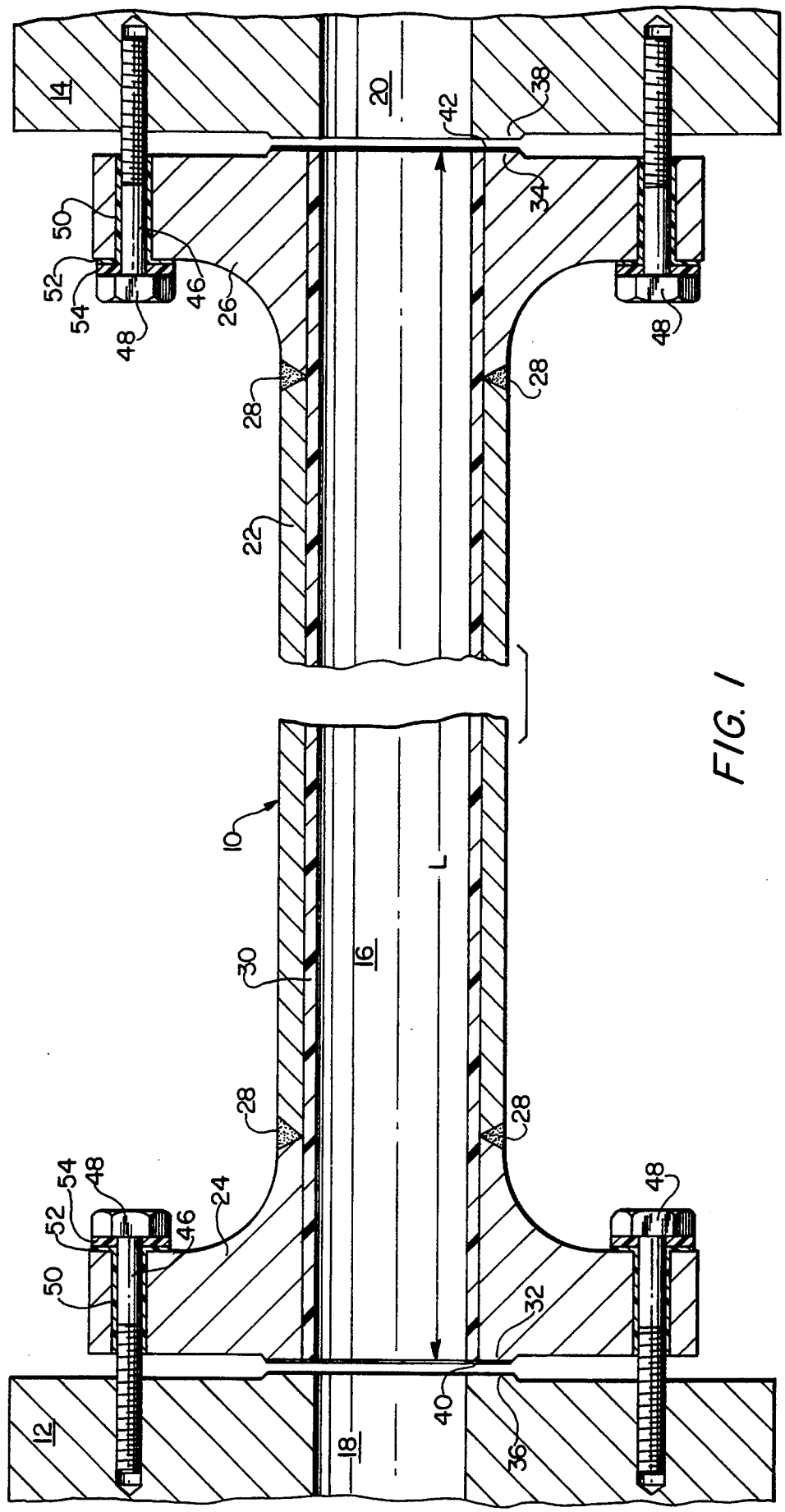
FIG. 1 is a cross-sectional view of the galvanic isolation device of the present invention.

Referring to FIG. 1, the principal component of the galvanic isolation device of the present invention is coupling pipe 10 for connecting a first fluid-conducting member 12 (e.g. a pipe) to a second fluid-conducting member 14 (e.g. a valve). For the purposes of illustration, coupling pipe 10 is shown slightly disconnected from members 12 and 14 in FIG. 1. The present invention has greatest utility when members 12 and 14 are made of dissimilar materials, e.g. a copper-nickel pipe being coupled to a steel valve. Coupling pipe 10 is provided with a fluid passageway 16 having substantially the same diameter as fluid passageways 18 and 20 of members 12 and 14, respectively. Passageways 16, 18 and 20 conduct water, especially sea water, in normal use. The sea water acts as an electrolyte in electrochemical corrosion that normally would occur if members 12 and 14, made of dissimilar materials, were directly or closely connected.

Coupling pipe 10 comprises a tubular section 22 and two flange sections 24 and 26, one on each end of tubular section 22. Although tubular section 22 shown in FIG. 1 is straight, it may be curved for a particular application. Coupling pipe 10 may be formed as a unitary device or flange sections 24 and 26 may be welded onto section 22 at weldment points 28, for example. A tubular liner 30 is formed on the inside diameters of sections 22, 24 and 26 and extends the length of coupling pipe 10. The inside diameters of sections 22, 24 and 26 can be machined slightly larger than the diameters of fluid passageways 18 and 20 to accommodate liner 30 and maintain the diameter of passageway 16 substantially the same as passageways 18 and 20. Liner 30 is made of any suitable material that resists chemical attack and has good electrical insulating properties. In a preferred embodiment, liner 30 is made of Teflon. Liner 30 may be attached to the inside diameter of coupling pipe 10 in any suitable manner but in a preferred embodiment it is adhesively bonded.

Flanges 24 and 26 are formed with annular flat ridges 32 and 34, respectively, for mating engagement with complementary flat ridges 36 and 38 of the first and second fluid-conducting members 12 and 14, respectively. Mounted on ridges 32 and 34 are annular dielectric insulators 40 and 42, respectively. Insulators 40 and 42 may be made of any suitable material having high compressive strength, the ability to resist cold flow, and having a high dielectric constant. In a preferred embodiment, insulators 40 and 42 are made of Rulon. Insulators 40 and 42 may be attached to flange ridges 32 and 34 in any suitable manner, but, in a preferred embodiment they are adhesively bonded.

Insulating liner 30 is coextensive with insulators 40 and 42 to provide a continuous insulation layer extending from one flange face of coupling pipe 10, along its entire length, to the other flange face. Thus, the two fluid-conducting members 12 and 14, which are made of dissimilar materials, are isolated from each other by a substantial distance. This substantial separation provided by the present invention reduces or may eliminate galvanic corrosion. The separation distance L corresponding to the length of coupling pipe 10 (flange end to flange end) will depend upon the circumstances in which the present invention is used.

In a preferred embodiment, the length L of coupling pipe 10 (flange end to flange end) is determined by the following equation:

$$L = D(E_c - E_A) K,$$

where
D = diameter of fluid passageway,
$E_c$ = corrosion potential of cathodic material,
$E_A$ = corrosion potential of anodic material, and
K = constant selected by the designer.

The value of constant K is selected on the basis of the reduction of corrosion potential desired or at least acceptable to the designer of the piping system. In a preferred embodiment, the following values for K are recommended on the basis of the expected life cycle of the parts of the piping system:

| Life Cycle | Value of K |
|---|---|
| 10 years | K = 10 |
| 20 years | K = 15 |
| 30 years | K = 25 |

Of course, the space constraints of the piping system in which the galvanic isolator of the present invention is to be used will also influence the designer's choice for L. Although a certain desired length L may be predetermined, a shorter length may actually be selected because of physical space restrictions.

Figure 2:
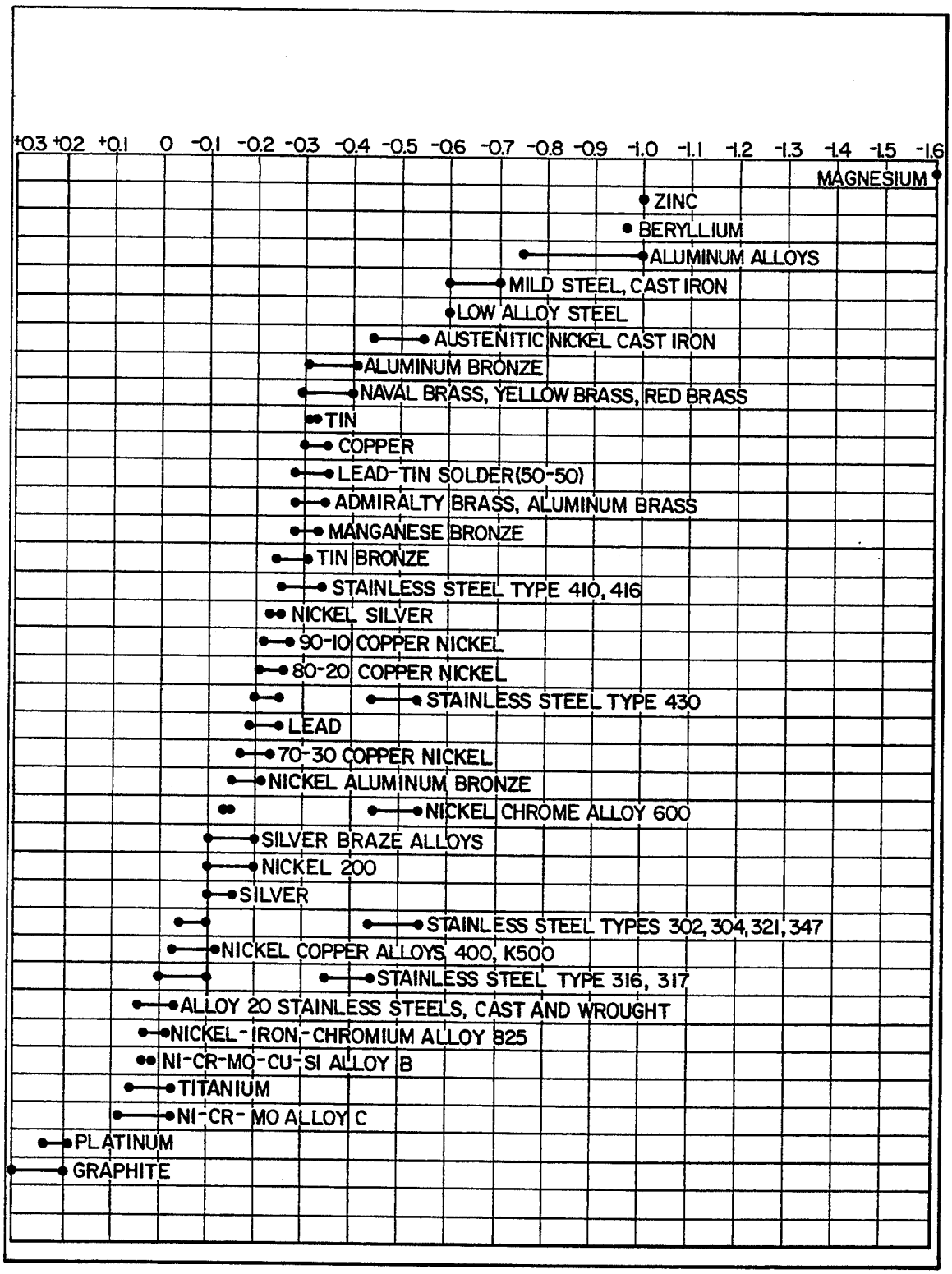
FIG. 2 is a chart showing the corrosion potential of various metals and alloys.

The corrosion potential of a particular metal or alloy is determined by conventional methods, well known in the art. The potential is generally measured by the electric potential (volts) that must be applied in order to prevent any dissolving action when the metal is immersed in a solution. FIG. 2 is an exemplary listing of common metals and alloys and their corrosion potentials in flowing sea water (8 to 13 ft./sec.) in the temperature range of 50°-80° F. The listing ranges from materials with the least potential to corrode (i.e. most noble) such as platinum and titanium with the more positive values to materials with the greatest potential to corrode such as zinc and magnesium with the more negative values.

As an example application of the above described formula for determining coupling pipe length L, consider coupling a titanium valve to a low alloy steel pipe, both having a 4 inch inner diameter fluid passageway. Assume also that the expected working life of the piping system is 20 years and there are no significant physical space restrictions for the coupling. From FIG. 2, the corrosion potential of the most noble or cathodic material, titanium, is nominally +0.05. The corrosion potential of the anodic material, low allow steel, is nominally −0.60. The potential difference $E_c - E_A$ is 0.05 − (−0.60) or 0.65. With K selected to be 15 and the diameter of the fluid passageway being 4 inches, the length L of coupling pipe for this example combination would be approximately 39 inches. If a longer working life of the piping system is expected, say 30 years, then K would be 25 and the length L would be approximately 65 inches. As will be readily appreciated, the more similar the two materials are in corrosion potential the shorter the pipe length requirement will be.

Referring again to FIG. 1, flanges 24 and 26 each contain bores 46 to accommodate screws 48 that secure coupling pipe 10 to the first and second fluid-conducting members 12 and 14. Bores 46 may be provided with an insulating sleeve 50 (made of polytetrafluoroethylene sold under the trademark "TEFLON", for example) and an insulating washer 52 (made of polytetrafluoroethylene sold under the trademark "RULON", for example) positioned between the body of flange 24 or 26 and a steel washer 54 to prevent any galvanic coupling between the screws 48 and flanges 24 and 26.

It is possible in use that an area of liner 30 may become chipped thus exposing material of coupling pipe sections 22, 24 or 26. Therefore, in a preferred embodiment, tubular section 22 as well as flange sections 24 and 26 are made of a noble metal, preferably Hastelloy C-276.

From the foregoing detailed description, it will be appreciated that the present invention is an advance in the art of galvanic isolation of two dissimilar materials. The coupling pipe of the present invention with an insulating liner coextensive with flange insulators provides a substantial isolation distance between the two dissimilar fluid-conducting members to prevent or at least significantly reduce electrochemical corrosion. Adaptations of the present invention, which will be apparent to those having skill in the art, are intended to be within the scope of the invention as defined by the following claims.

I claim:

1. A device for galvanically isolating two fluid-conducting members made of dissimilar materials comprising:

a coupling pipe connected on a first end to a first fluid-conducting member and connected on a second end to a second fluid-conducting member;

said pipe having an inner diameter defining a fluid passageway between said first and second fluid-conducting members and an insulating liner attached to said pipe inner diameter along the entire length of said pipe;

a first dielectric insulator positioned on one end of said pipe between said pipe and said first fluid-conducting member and a second dielectric insulator positioned on a second end of said pipe between said pipe and said second fluid-conducting member; and wherein said coupling pipe has a length L and wherein said length L is determined by the equation:

$$L = D[E_C - E_A] K,$$

where
D = said inner diameter of said pipe
$E_C$ = corrosion potential of said first fluid-conducting member
$E_A$ = corrosion potential of said second fluid-conducting member, and
K = constant.

2. A device as in claim 1 wherein said insulating liner is coextensive with said first and second dielectric insulators to provide continuous insulation along the entire length of said pipe between said first and second fluid-conducting members.

3. A device as in claim 1 wherein said liner is made of material having good electrical insulating properties.

4. A device as in claim 3 wherein said liner is made of polytetrafluoroethylene sold under the trademark "TEFLON".

5. A device as in claim 1 wherein said first and second insulators are made of a material with high compressive strength.

6. A device as in claim 5 wherein said first and second insulators are made of polytetrafluoroethylene sold under the trademark "RULON".

7. A device as in claim 1 wherein said liner is adhesively bonded to said coupling pipe.

8. A device as in claim 1 wherein said first and second insulators are adhesively bonded to said coupling pipe.

9. A device as in claim 1 wherein said pipe includes a tubular section and a first flange section on one end of said tubular section and a second flange section on a second end of said tubular section.

10. A device as in claim 9 wherein said first and second flange sections are welded to said tubular section.

11. A device as in claim 9 wherein said first and second flange sections are formed with first and second annular flat ridges, respectively, for engagement with said first and second fluid-conducting members, respectively.

12. A device as in claim 11 wherein said first and second dielectric insulators are annular and are located on said first and second annular ridges, respectively.

13. A device as in claim 12 wherein said first and second dielectric insulators are made of a material with high compressive strength.

14. A device as in claim 13 wherein said first and second dielectric insulators are made of polytetrafluoroethylene sold under the trademark "RULON".

15. A device as in claim 9 wherein said first and second flange sections each include a plurality of bores for receiving a plurality of screws for attachment of said coupling pipe to said first and second fluid-conducting members.

16. A device as in claim 15 including a plurality of insulating sleeves, each one of said plurality of insulating sleeves being positioned in a respective one of said plurality of bores.

17. A device as in claim 15 including a plurality of insulating washers for insulating said first and second flange sections from metal washers attached to screws received in said bores.

18. A device as in claim 1 wherein said coupling pipe is made of a noble metal.

19. A device as in claim 18 wherein said coupling pipe is made of Hastelloy C-276.

20. A device as in claim 1 wherein said constant K is a function of a working life cycle of said first and second fluid-conducting members.

* * * * *